(12) United States Patent
Kumazawa et al.

(10) Patent No.: US 7,092,806 B2
(45) Date of Patent: Aug. 15, 2006

(54) ACTIVATION SYSTEM FOR PASSENGER PROTECTION APPARATUS

(75) Inventors: Hidehiko Kumazawa, Nagoya (JP); Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 430 days.

(21) Appl. No.: 10/606,840

(22) Filed: Jun. 27, 2003

(65) Prior Publication Data

US 2004/0004396 A1 Jan. 8, 2004

(30) Foreign Application Priority Data

Jul. 3, 2002 (JP) ............................. 2002-194617

(51) Int. Cl.
*B60R 21/32* (2006.01)
(52) U.S. Cl. .................. 701/45; 280/735; 180/282
(58) Field of Classification Search ............ 701/45–47; 307/10.1; 280/735; 180/271, 282
See application file for complete search history.

(56) References Cited

U.S. PATENT DOCUMENTS

| | | | | |
|---|---|---|---|---|
| 5,338,062 | A | * | 8/1994 | Kiuchi et al. ............... 280/735 |
| 6,005,479 | A | * | 12/1999 | Ide ............................. 340/438 |
| 6,095,554 | A | * | 8/2000 | Foo et al. ................... 280/735 |
| 6,167,335 | A | * | 12/2000 | Ide et al. ..................... 701/45 |
| 6,246,937 | B1 | * | 6/2001 | Miyaguchi et al. .......... 701/45 |
| 6,256,564 | B1 | * | 7/2001 | Miyaguchi et al. .......... 701/45 |
| 6,274,948 | B1 | | 8/2001 | Blank et al. |
| 6,353,784 | B1 | * | 3/2002 | Miyaguchi et al. .......... 701/45 |
| 6,373,147 | B1 | * | 4/2002 | Miyaguchi et al. ........ 307/10.1 |
| 6,647,331 | B1 | * | 11/2003 | Imai et al. ................... 701/45 |
| 6,728,604 | B1 | * | 4/2004 | Ugusa et al. .................. 701/1 |
| 2005/0200105 | A1 | * | 9/2005 | Mihara et al. ............. 280/735 |

FOREIGN PATENT DOCUMENTS

JP 2001-515815 9/2001

* cited by examiner

*Primary Examiner*—Gary Chin
(74) *Attorney, Agent, or Firm*—Posz Law Group, PLC (57) ABSTRACT

Provided is an activation system for a passenger protection apparatus capable of detecting a collision acceleration accurately and in detail with a simple configuration for appropriately activating apparatus. A satellite sensor unit side converts a detection output from an electronic acceleration sensor into a digital collision acceleration data and sequentially it to a communication line at a predetermined cycle, while an air bag control unit side makes a decision on collision at a front portion of a vehicle on the basis of a central-portion acceleration detected by an acceleration sensor and the collision acceleration data received through the line for the activation of air bags. This configuration enables only the air bag control unit side to make a collision decision without making a collision decision in the satellite sensor unit side, which allows a simple and low-cost system.

12 Claims, 9 Drawing Sheets

ACCELERATION DATA (EX. A)

FIG. 9B

FIRST BYTE TRANSMITTED/RECEIVED DATA (EX. A1)

FIG. 9C

SECOND BYTE TRANSMITTED/RECEIVED DATA (EX. A2)

FIG. 9D

THIRD BYTE TRANSMITTED/RECEIVED DATA (EX. A3)

ACTIVATION SYSTEM FOR PASSENGER PROTECTION APPARATUS

BACKGROUND OF THE INVENTION

1) Field of the Invention

The present invention relates to an activation system for a passenger protection apparatus which is made to activate the passenger protection apparatus in accordance with a behavior of a vehicle.

2) Description of the Related Art

So far, for example, in an air bag system for use in a vehicle, an acceleration of the vehicle is detected through the use of an acceleration sensor in an air bag ECU located at a central portion of the vehicle in its longitudinal directions to make a decision indicating the occurrence of a collision of the vehicle when a result of the acceleration detection exceeds a predetermined threshold so that an air bag is deployed for protecting a passenger(s) (including a driver) from the impact due to the collision. Moreover, in such an air bag system for a vehicle, a mechanical acceleration switch, serving as a collision sensor, is provided in a front portion of the vehicle to transmit a switching signal to the air bag ECU when detecting a collision acceleration above a predetermined value. Still moreover, the air bag ECU changes the above-mentioned predetermined threshold to a value lower than a normal value on the basis of the switching signal, thereby detecting the impact at the front portion of the vehicle securely to spread the air bag.

However, such a mechanical acceleration switch merely outputs a switching signal indicative of only the presence or absence of the collision and this signifies that difficulty is experienced in acquiring the collision acceleration in detail. On the other hand, in place of the mechanical acceleration switch, there has been proposed a technique in which an electronic acceleration sensor is provided in a front portion of a vehicle so that a detailed collision acceleration is detected on the basis of an analog signal from the electronic acceleration sensor.

There is a problem which arises with the employment of such an electronic acceleration sensor functioning as a collision sensor, however, in that noise acting on a communication line between the acceleration sensor and the air bag ECU can considerably throw off the analog acceleration signal to be transmitted from the acceleration sensor.

In consideration of this problem, PCT Japan National Publication No. 2001-515815 discloses a technique in which an evaluation function is provided in a collision sensor unit to make a decision on the occurrence of collision and, when the evaluation function detects and confirms the fact that a collision sensor signal forming a analog signal or a collision signal derived from the collision sensor signal reaches a predetermined value within a predetermined period of time, a code signal is transmitted to an air bag ECU in the form of a digital signal.

However, in the case of the technique disclosed in PCT Japan National Publication No. 2001-515815, because of the collision decision function being provided in the collision sensor unit, in addition to an CPU of the air bag ECU, there is a need to use another CPU in the collision sensor unit, which complicates the system configuration and increases the manufacturing cost.

SUMMARY OF THE INVENTION

The present invention has been developed with a view to eliminating the above-mentioned problems, and it is therefore an object of the invention to provide an activation system for a passenger protection apparatus, capable of accurately detecting a detailed collision acceleration through the use of a simple configuration to activate a passenger protection apparatus appropriately.

For this purpose, in accordance with a first aspect of the present invention, there is provided an activation system for a passenger protection apparatus, designed to activate the passenger protection apparatus in accordance with a behavior of a vehicle, the system comprising a collision sensor unit provided in a front or rear portion of the vehicle for detecting a collision acceleration of the vehicle, a control unit provided at a central portion of the vehicle in its longitudinal direction for controlling activation of the passenger protection apparatus, and a communication line provided between the collision sensor unit and the control unit, wherein the collision sensor unit includes a collision acceleration sensor for outputting the collision acceleration of the front portion of the vehicle in the form of an analog signal, conversion means for converting the analog signal outputted from the collision acceleration sensor into digital data corresponding to its signal output level every predetermined sampling time and for outputting the digital signal and a transmission means for sequentially transmitting the digital data outputted from the conversion means to the communication line at a predetermined interval, and the control unit includes a central-portion acceleration sensor for detecting and outputting an acceleration of a central portion of the vehicle, reception means for receiving the digital data outputted from the collision sensor unit through the communication line, collision decision means for making a decision on the occurrence of collision of the vehicle on the basis of the detection output from the central-portion acceleration sensor and the digital data received by the reception means and activation control means for controlling the activation of the passenger protection apparatus on the basis of a result of the decision in the collision decision means.

Thus, in the collision sensor unit, the collision acceleration sensor outputs a collision acceleration of a front portion of the vehicle in the form of an analog signal, the conversion means converts the analog signal outputted from the collision acceleration sensor into digital data corresponding to its signal output level every predetermined sampling time and outputs it, and the transmission means sequentially transmits the digital data outputted from the conversion means to the communication line at a predetermined interval. In the meantime, in the control unit, the central-portion acceleration sensor detects an acceleration of a central portion of the vehicle, the reception means receives the digital data outputted from the collision sensor unit through the communication line, the collision decision means makes a decision on the occurrence of collision of the vehicle on the basis of the detection output from the central-portion acceleration sensor and the digital data received by the reception means, and the activation control means controls the activation of the passenger protection apparatus on the basis of a result of the detection in the collision decision means.

Accordingly, the collision sensor unit side sequentially transmits the digital data representative of a collision acceleration of a front portion of the vehicle to the communication line at a predetermined interval without making a decision on collision, which enables the collision sensor unit to be constructed with a simple and low-cost configuration. Moreover, the collision decision means in the control unit side is designed to make a decision on the occurrence of collision of a front portion of the vehicle on the basis of the detection output from the central-portion acceleration sensor and the digital data representative of a collision acceleration of the front portion of the vehicle received by the reception means, which enables an accurate and detailed collision decision for the proper activation of the passenger protection apparatus.

In addition, in accordance with a second aspect of the present invention, there is provided an activation system for a passenger protection apparatus, designed to activate the passenger protection apparatus in accordance with a behavior of a vehicle, the system comprising a collision sensor unit provided in a side surface portion of the vehicle for detecting a collision acceleration of the vehicle, a control unit provided at a central portion of the vehicle in its lateral direction for controlling activation of the passenger protection apparatus, and a communication line provided between the collision sensor unit and the control unit, wherein the collision sensor unit includes a collision acceleration sensor for outputting the collision acceleration of the side surface portion of the vehicle in the form of an analog signal, conversion means for converting the analog signal outputted from the collision acceleration sensor into digital data corresponding to its signal output level every predetermined sampling time and for outputting the digital signal and a transmission means for sequentially transmitting the digital data outputted from the conversion means to the communication line at a predetermined interval, and the control unit includes a central-portion acceleration sensor for detecting and outputting an acceleration of a central portion of the vehicle, reception means for receiving the digital data outputted from the collision sensor unit through the communication line, collision decision means for making a decision on the occurrence of collision of the vehicle on the basis of the detection output from the central-portion acceleration sensor and the digital data received by the reception means and activation control means for controlling the activation of the passenger protection apparatus on the basis of a result of the decision in the collision decision means.

Thus, in the collision sensor unit, the collision acceleration sensor outputs a collision acceleration of a side surface portion of the vehicle in the form of an analog signal, the conversion means converts the analog signal outputted from the collision acceleration sensor into digital data corresponding to its signal output level every predetermined sampling time and outputs it, and the transmission means sequentially transmits the digital data outputted from the conversion means to the communication line at a predetermined interval. In the meantime, in the control unit, the central-portion acceleration sensor detects an acceleration of a central portion of the vehicle, the reception means receives the digital data outputted from the collision sensor unit through the communication line, the collision decision means makes a decision on the occurrence of collision of the vehicle on the basis of the detection output from the central-portion acceleration sensor and the digital data received by the reception means, and the activation control means controls the activation of the passenger protection apparatus on the basis of a result of the detection in the collision decision means.

Accordingly, the collision sensor unit side sequentially transmits the digital data representative of a collision acceleration of a side surface portion of the vehicle to the communication line at a predetermined interval without making a decision on collision, which enables the collision sensor unit to be constructed with a simple and low-cost configuration. Moreover, the collision decision means in the control unit side is designed to make a decision on the occurrence of collision of a side surface portion of the vehicle on the basis of the detection output from the central-portion acceleration sensor and the digital data representative of a collision acceleration of the side surface portion of the vehicle received by the reception means, which enables an accurate and detailed collision decision for the proper activation of the passenger protection apparatus.

Still additionally, according to a third aspect of the present invention, in the foregoing activation system for a passenger protection apparatus, the collision sensor unit includes filter means for deriving a signal component needed for the collision decision from the analog signal outputted from the collision acceleration sensor.

Thus, the filter means extracts a low-frequency component incidental to collision of the vehicle from the frequency components of the analog signal and the conversion means converts the extracted analog signal into digital data, thereby achieving the accurate and sure collision decision.

Yet additionally, according to a fourth aspect of the present invention, in the foregoing activation system for a passenger protection apparatus, the conversion means is an analog/digital converter having a resolution and a sampling rate whereby a collision decision waveform is reproducible.

Thus, since a collision decision waveform is securely regenerable on the basis of an output of the analog/digital converter, an accurate and reliable collision decision is achievable.

Moreover, according to a fifth aspect of the present invention, in the foregoing activation system for a passenger protection apparatus, the analog/digital converter has a resolution exceeding 8 bits and a sampling rate exceeding 2 kHz.

Thus, the analog/digital converter can produce digital data having a data length exceeding 8 bits and output it at a sampling rate exceeding 2 kHz and, hence, a collision decision waveform is precisely regenerable.

Still moreover, according to a sixth aspect of the present invention, in the foregoing activation system for a passenger protection apparatus, the transmission means is made to carry out a current communication by controlling a current value on the communication line on the basis of the digital data.

Accordingly, a power supply line can be used as a communication line, thereby allowing communications between the collision sensor unit and the control unit through the use of less communication lines.

Yet moreover, according to a seventh aspect of the present invention, in the foregoing activation system for a passenger protection apparatus, the transmission means adds a parity bit to the digital data at the transmission.

Thus, a parity bit is added to the digital data so that the detection of an error of received data (garbled received data) is feasible, thereby preventing the reception of mistaken data.

Furthermore, according to an eighth aspect of the present invention, in the foregoing activation system for a passenger protection apparatus, the transmission means continuously transmits each of the digital data a predetermined number of times equal to or more than twice while the control unit includes received data decision means for making a decision indicating the reception of correct (good) data when all the digital data continuously received with the predetermined number of times through the reception means are identical to each other.

Thus, when the data reception continuously takes place a predetermined number of times in the reception means and all the received data are identical to each other, the received data decision means makes a decision that the received data are correct. This enables certain detection of the error of the data stemming from the disturbance noise on the communication line so that the reception of mistaken data is preventable.

Still furthermore, according to a ninth aspect of the present invention, in the foregoing activation system for a passenger protection apparatus, the transmission means transmits a combination of the digital data and mirror data obtained by mirroring the digital data, while the control unit includes received data decision means for making a decision indicating the reception of correct data when the combination of the digital data and the mirror data received through the reception means is correct.

Thus, when the combination of the digital data and the mirror data, received by the reception means, is correct, the received data decision means makes a decision that the received data are correct. This enables sure detection of the error of the data stemming from the disturbance noise on the communication line so that the reception of mistaken data is preventable.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Embodiments of the present invention will be described hereinbelow with reference to the drawings, where passenger protection apparatus activation systems according to the present invention are introduced into air bag activation systems.

Figure 1:
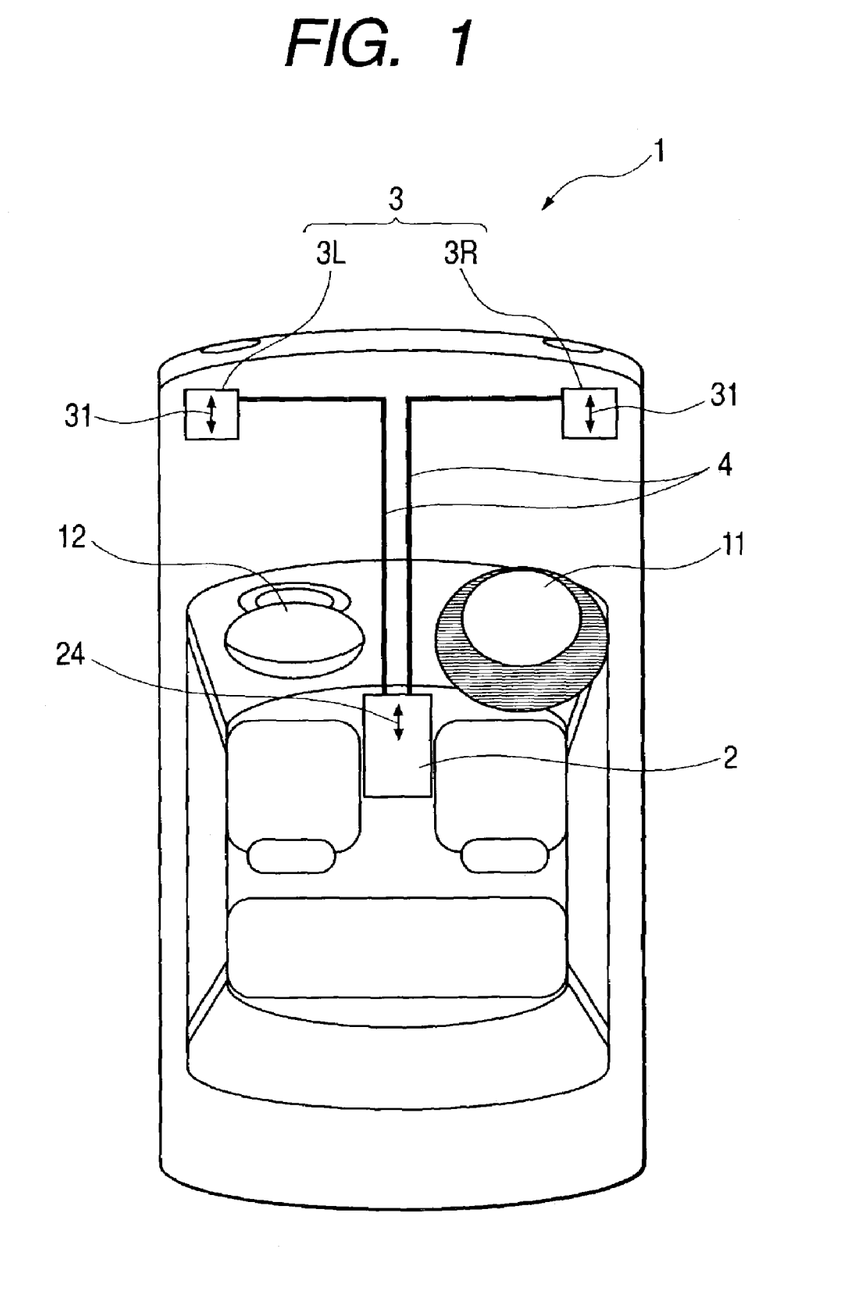
FIG. 1 is a plan view illustratively showing the in-vehicle locations of parts constituting an air bag activation system according to a first embodiment of the present invention.

FIG. 1 is a plan view illustratively showing the in-vehicle locations of components of an air bag activation system 1 according to a first embodiment of the present invention As FIG. 1 shows, the air bag activation system is made up of an air bag electronic control unit (which will hereinafter be referred to as an "air bag ECU") 2 located at a generally central portion of a vehicle in its longitudinal direction and in its lateral direction, a satellite sensor unit 3 composed of a left-side satellite sensor unit 3L placed in a front left side of the vehicle and a right-side satellite sensor unit 3R placed in a front right side of the vehicle, and communication lines 4 provided between the air bag ECU 2 and the satellite sensor unit 3 (3L and 3R in detail). Moreover, the vehicle is equipped with an air bag 11 for a driver's seat and an air bag 12 for an assistant driver's seat, which are for the purpose of protecting passengers from a head-on collision of the vehicle. In this connection, the air bag ECU 2, the satellite sensor unit 3 and the air bags 11, 12 constitute a control unit, a collision sensor unit and a passenger protection apparatus in the present invention, respectively.

Figure 2:
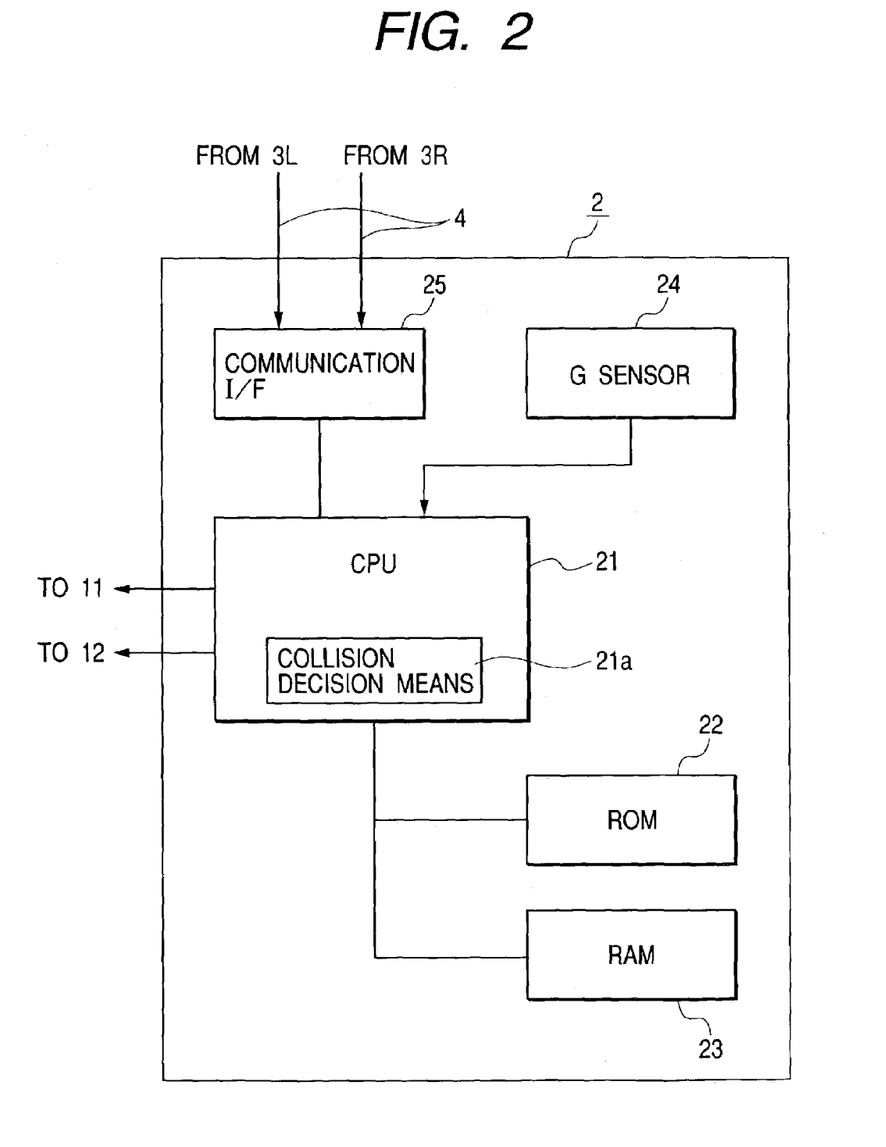
FIG. 2 is a block diagram schematically showing a configuration of an air bag ECU.

The air bag ECU 2 is an electronic control unit designed to control the activation of the air bags 11 and 12 while making a decision on the occurrence of collision of the vehicle, and is made up of a CPU 21, a ROM 22, a RAM 23, an acceleration sensor (which will hereinafter be referred to as a "G sensor") 24 and a communication interface 25. For example, the air bag ECU 2 is located at a generally central portion of the vehicle in its longitudinal direction and in its lateral directions. However, the longitudinal location thereof is not always required to be the central position because the requirements are only the avoidance of breakdown due to the collision in longitudinal directions and the certain propagation of the collision waveform. Moreover, the CPU 21 reads out and executes control programs stored in the ROM 22, thereby realizing a collision decision means 21a. In this embodiment, the G sensor 24 and the communication interface 25 constitute a central-portion acceleration sensor and a receiving means in the present invention, respectively.

The G sensor 24 is an electronic acceleration sensor made to detect an acceleration in longitudinal directions of a vehicle, which develops in response to a collision of the vehicle against an obstruction, for example, at a central portion of the vehicle and to output it in the form of an analog signal. The communication interface 25 is a communication unit connected to each of the communication lines 4 for receiving digital data representative of a collision acceleration transmitted from each of the satellite sensor units 3L and 3R through the communication line 4.

Figure 3:
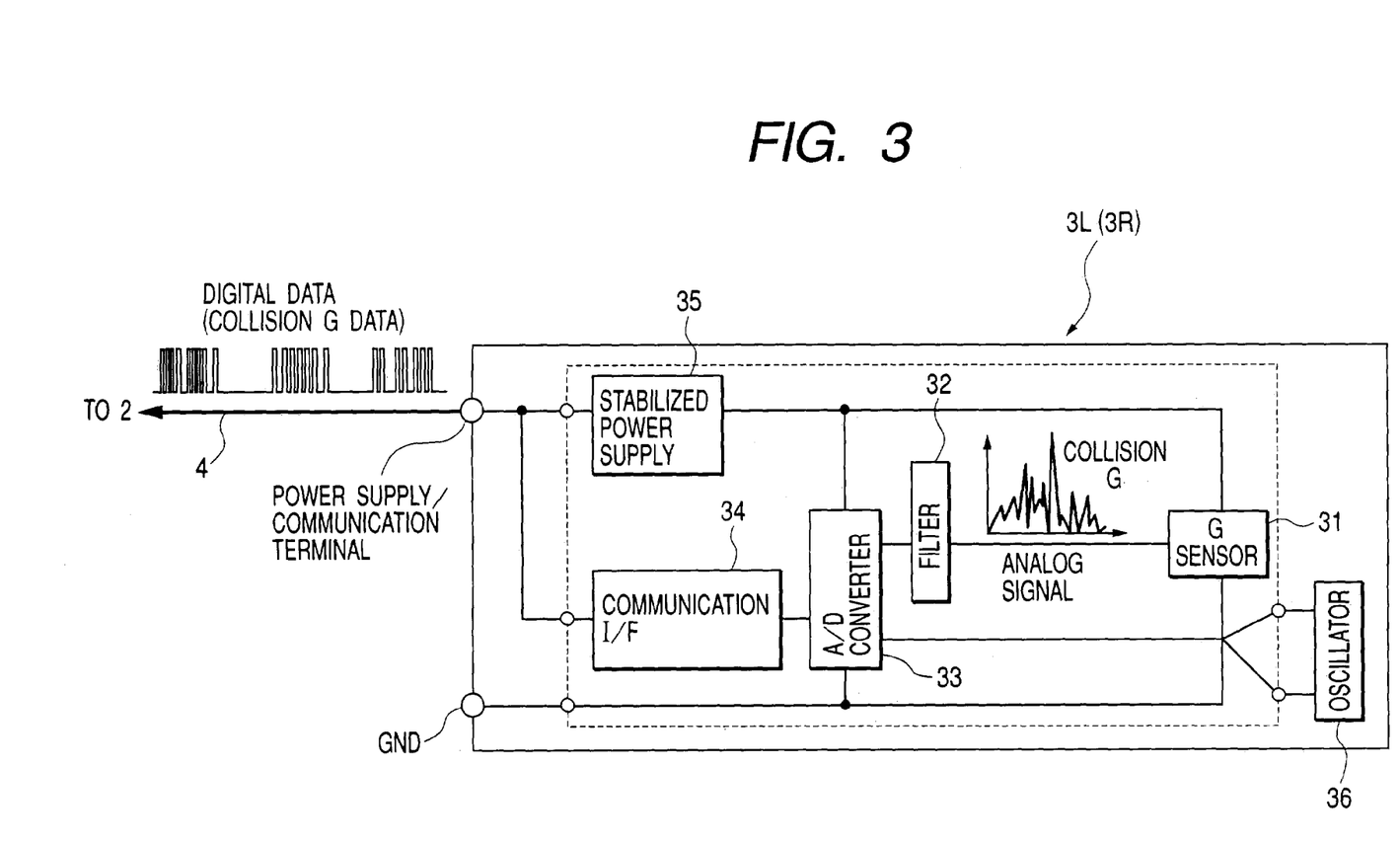
FIG. 3 is a block diagram schematically showing a satellite sensor unit.

The left-side satellite sensor unit 3L organizing the satellite sensor unit 3 is for detecting a collision acceleration on a front left side of the vehicle to send it to the air bag ECU 2, and is composed of a G sensor 31, a filter 32 for deriving a frequency component needed for a decision on collision, an analog/digital converter (which will hereinafter be referred to as an "A/D converter") 33, a communication interface 34, a stabilized power supply (for example, 5-V power supply) 35, and an oscillator 36 for supplying a clock signal to the A/D converter 33. In this connection, the G sensor 31, the filter 32 and the communication interface 34 constitute a collision acceleration sensor, a filter means and a transmission means in the present invention, respectively.

The G sensor 31 is an electronic acceleration sensor made to detect a collision acceleration, occurring due to a collision of the vehicle against an obstruction, at a front left portion of the vehicle and to output it in the form of an analog signal. The filter 32 is for extracting and outputting a frequency component related to the collision of the vehicle from frequency components of the analog signal from the G sensor 31. The A/D converter 33 is for converting the analog signal outputted from the filter 32 into digital data corresponding to an output level of the analog signal with a resolution (for example, 8 bits or more) and a sampling rate (for example, 2 kHz or more) whereby a collision decision waveform is regenerable (digital data indicative of a collision acceleration to be outputted from the A-D converter 33 will hereinafter be referred to as "G data"). The communication interface 34 is connected to the communication line 4 and is made to set the G data outputted from the A/D converter 33 as transmission data having a data structure, which will be described later, and to send it to the communication line 4 after converting into a current value. The stabilized power supply 35 is for supplying power to each part of the left-side satellite sensor unit 3L, and also functions as a current supply source for transmission data to be sent out to the communication line 4.

On the other hand, the right-slide satellite sensor unit 3R is made to detect a collision acceleration of a front right portion of the vehicle to transmit it to the air bag ECU 2. The difference of the right-slide satellite sensor unit 3R from the left-side satellite sensor unit 3L is only the location in the front side of the vehicle and they have the same configuration, and the detailed description thereof will be omitted for brevity.

Figure 4:
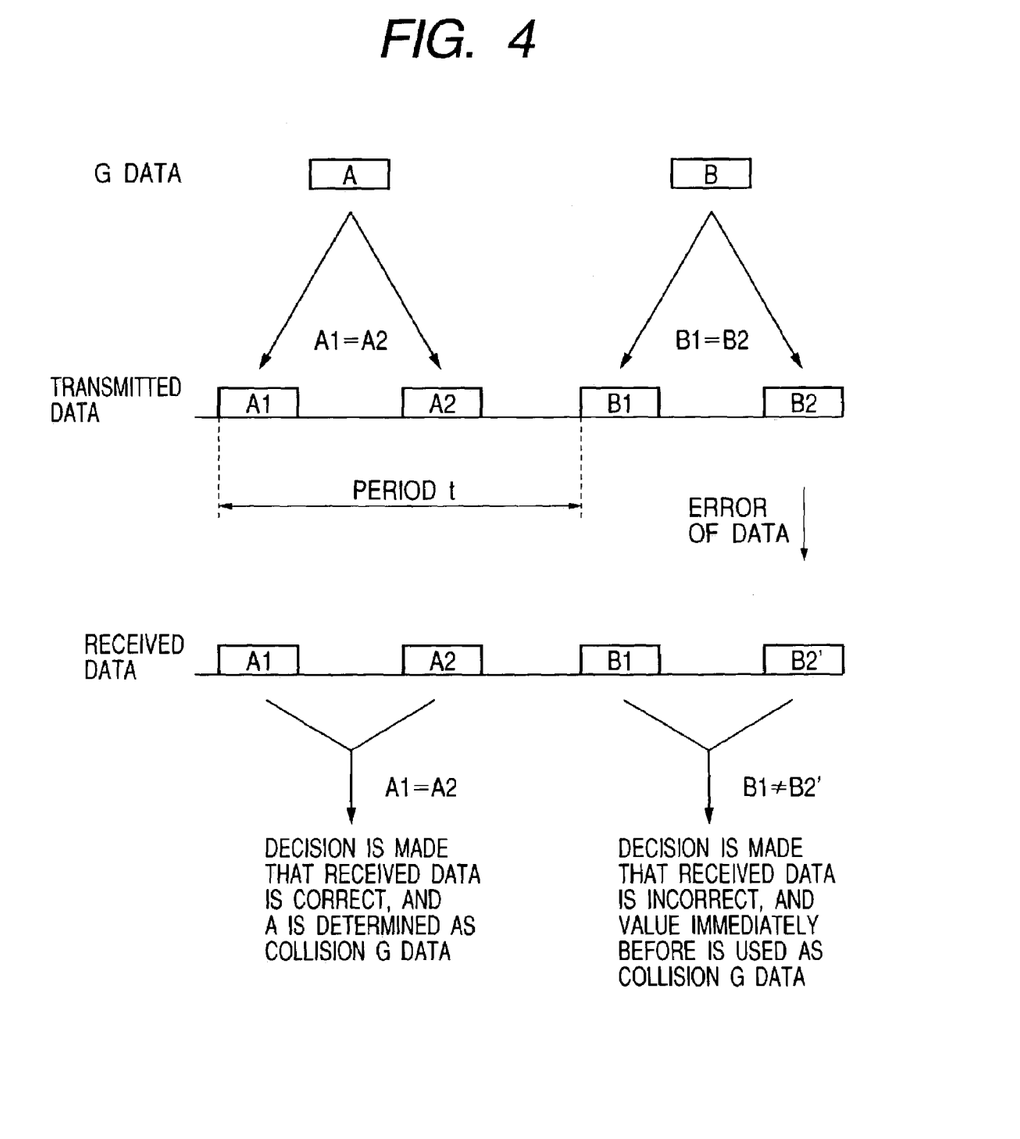
FIG. 4 is an illustrative view useful for explaining a G data transmission mode.

Referring to FIG. 4, a description will be given hereinbelow of a data transmission mode in the communication interface 34.

The communication interface 34 is designed to transmit G data in a well-known communication mode (for example, NRZ mode). In order to prevent the reception of mistaken data due to an error of the signal (garbled signal) stemming from the vehicle or disturbance noise on the communication line 4, one G data is set as transmission data with a predetermined structure and is continuously transmitted twice to the communication line 4.

For example, G data A is continuously transmitted as the same transmission data A1 and A2, and G data B is continuously transmitted as the same transmission data B1 and B2.

Figure 5A:
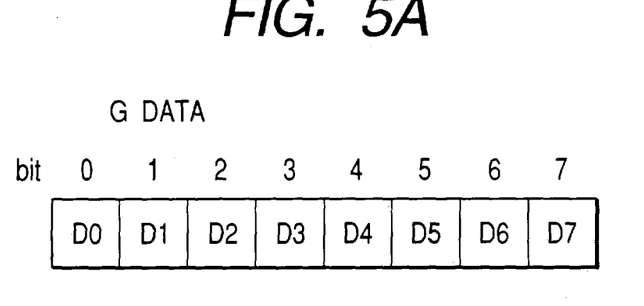
FIG. 5 is an illustrative view useful for explaining data structures of G data and transmitted/received data.
Figure 5B:
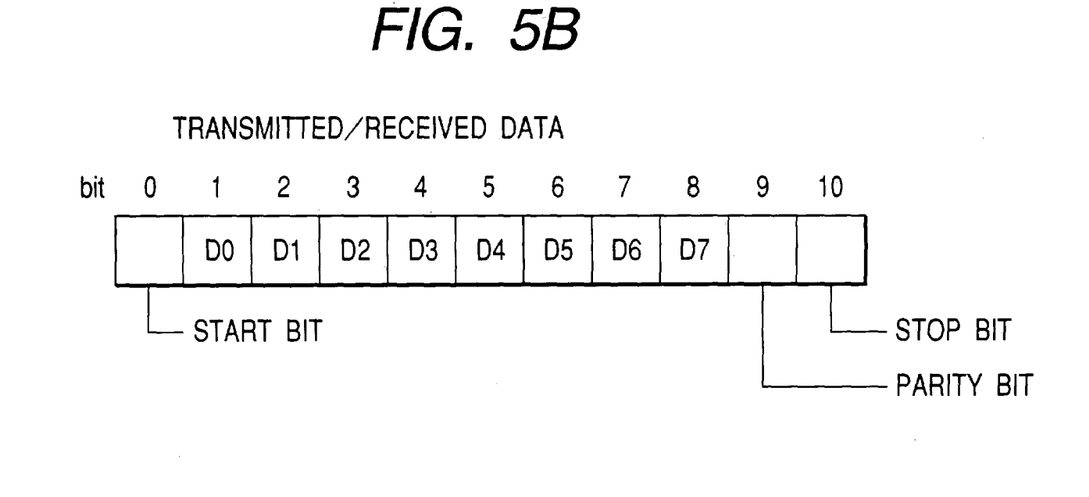

In this case, the structure of the G data is expressed by 8 bits (256 steps from 0 to 255) as shown in FIG. 5A. On the other hand, the transmission data is expressed as shown in FIG. 5B. That is, the transmission data has an 11-bit structure comprising 8-bit G data (bits 1 to 8) outputted from the A-D converter 33, a parity bit (1 bit: bit 9), a start bit (1 bit: bit 0) and a stop bit (1 bit: bit 10). The start/stop bit is set at a predetermined value (for example, 0). Moreover, with respect to the parity bit, the number of "1" of the 11-bit data is set to be an even number. However, since the parity bit is added in order to enhance the redundancy of data, it is omissible.

Furthermore, the G-data transmission period (interval) t is set at a sufficiently short time, for example, approximately 500 µs or less, with respect to the vehicle induction noises (for example, ignition pulse, electric horn, head lamp, and others) which are expected to exert influence on the communication lines 4. For example, in a case in which the G-data transmission period is set at 500 µs, the transmission rate can be set at 125 kbps (the transmission time per bit is 8 µs, and the transmission time per data (11 bits) is 88 µs), and the same transmission data can continuously be transmitted twice at an interval of 250 µs.

In addition, referring to a flow chart of FIG. 6, a description will be given hereinbelow of a flow of processing in an air bag activation control routine. This air bag activation control routine is realized in a manner such that the CPU 21 reads out and executes the control program stored in the ROM 22 of the air bag ECU 2.

First of all, a first step 1 (which will be referred to hereinafter as "S1"; other steps will be expressed in like manner) is implemented to receive data transmitted from the satellite sensor unit 3 through the communication lines 4. Subsequently, a decision is made as to whether the received data is correct or not (S2).

In this case, the decision as to whether the received data is correct or not depends upon whether or not the continuous received data agree with each other. For example, as shown in FIG. 4, if the continuous received data A1 and A2 are equal to each other, the decision indicates that the received data is correct. On the other hand, in a case in which an error occurs so that the transmission data B2 turns into data B2', the continuous received data B1 and B2' do not agree with each other and, hence, the decision is made that the received data is in a mistaken condition.

If the decision is made that the received data is correct (S2: Yes), the G data included in the received data is determined as collision G data representative of the present collision acceleration (S3). On the other hand, if the decision on the received data indicates the occurrence of an error (S2: No), in place of it, the G data immediately before is used as the present G data.

Following this, a collision decision threshold is set in accordance with the collision G data (S5). For example, the collision decision threshold is set to be lower with an increase in the collision G data value.

Thereafter, an acceleration (central-portion acceleration) at a central portion of the vehicle, detected and outputted by the G sensor 24 of the air bag ECU 2, is acquired (S6) to make a decision as to whether or not the central-portion acceleration exceeds the collision decision threshold set in S5 (S7).

If the central-portion acceleration does not exceed the collision decision threshold (S7: No), the decision in S7 shows no occurrence of collision and, hence, the operational flow proceeds repeatedly to S1 and subsequent processing. On the other hand, if the central-portion acceleration exceeds the collision decision threshold (S7: Yes), the decision shows the occurrence of collision, and the activation control for the air bags 11 and 12 takes place (S8), thereby spreading the air bags 11 and 12 in an instant for surely protecting the passenger(s) from the impact due to the vehicle collision.

In this connection, the steps indicated by S2, S7 and S8 function as the received data decision means, the collision decision means and the activation control means in the present invention, respectively.

As obvious from the above description, according to this embodiment, in the satellite sensor unit 3 side, the G data indicative of a collision acceleration of a front portion of the vehicle is sequentially transmitted to the communication line 4 at a predetermined interval without making a collision decision. This signifies that there is no need to use a CPU in the satellite sensor unit 3 side, which enables the satellite sensor unit 3 to be easily constructed at a low cost. Moreover, since the collision decision is made in the air bag ECU 2 side, there is no need to pay attention to the compatibility of a decision software in the satellite sensor, which allows the satellite sensor to be used in a standard manner. Still moreover, in the air bag ECU 2 side, the decision is made on the occurrence of collision at a front portion of the vehicle on the basis of the detection output (central-portion acceleration) from the G sensor 24 and the G data received through the communication interface 25 and indicative of a collision acceleration of the front portion of the vehicle (S7), which enables an accurate and detailed collision decision for activating the air bags 11 and 12 appropriately.

In addition, since the filter 32 extracts a low-frequency component related to a collision of the vehicle from the frequency components of the analog signal and the A-D converter 33 converts the extracted analog signal into digital data and outputs it, an accurate and certain collision decision becomes feasible.

Still additionally, since the communication interface 34 is made to control the current value on the communication line 4 on the basis of the G data for carrying out the current communications, the power supply line is available as the communication line 4, thus enabling the communications between the satellite sensor unit 3 and the air bag ECU 2 to be achieved through the use of a smaller number of communication lines.

Yet additionally, in the step of S2, in a case in which the data continuously received twice are the same, the decision indicates the reception of correct data and, hence, an error of data occurring due to disturbance noise on the communication line 4 is securely detectable, thus preventing the reception of mistaken data. Moreover, owing to the addition of a parity bit to the G data, the detection of the error of the received data becomes more securely feasible.

Secondly, referring to FIG. 7, a description will be given hereinbelow of a second embodiment of the present invention. In this illustration, the same parts as those in the first embodiment are marked with the same reference numerals, and the description thereof will be omitted for simplicity.

In this embodiment, the present invention is applied to a side-surface collision air bag activation system.

Figure 7:
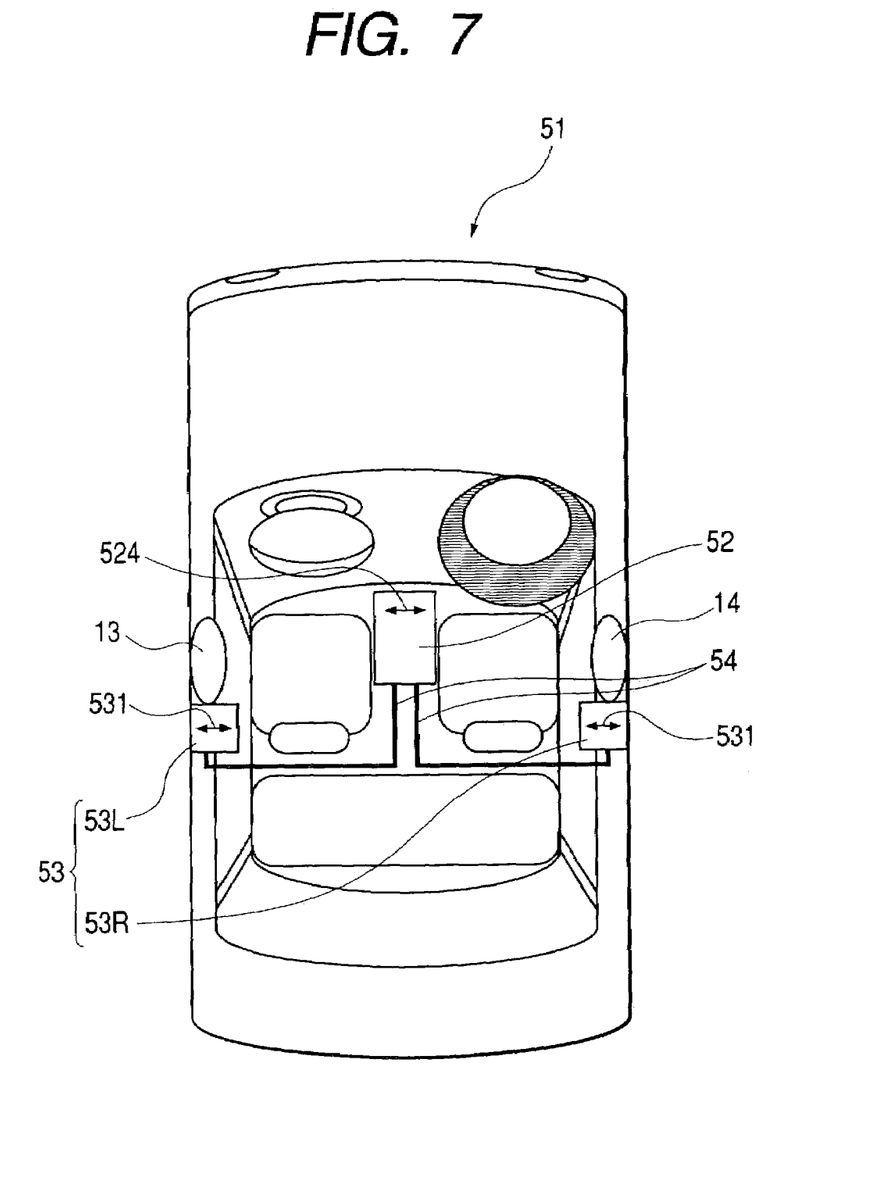
FIG. 7 is a plan view illustratively showing the in-vehicle locations of parts constituting an air bag activation system according to a second embodiment of the present invention.

That is, as FIG. 7 shows, side-surface air bags 13 and 14 are provided on inner side surfaces of a vehicle, respectively, and an air bag activation system 51 is made up of a an air bag ECU 52 provided at generally central portion of a vehicle in its longitudinal directions and in its lateral directions, a satellite sensor unit 53 comprising a left-side satellite sensor unit 53L located in a left-side center pillar of the vehicle and aright-side satellite sensor unit 53R located in a right-side center pillar thereof, and communication lines 54 placed between the air bag ECU 52 and the satellite sensor unit 53 (53L and 53R in detail). In this connection, the air bag ECU 52 constitutes a control unit in the present invention and the satellite sensor units 53L and 53R organize a collision sensor unit therein.

The air bag ECU 52 is equipped with a G sensor 524 for detecting an acceleration in lateral directions of the vehicle. Each of the satellite sensor units 53L and 53R is equipped with a G sensor 531 for detecting an acceleration in lateral directions of the vehicle. A collision acceleration originating from a collision against a side surface of the vehicle is detectable through the use of these G sensors. In this connection, the G sensor 524 constitutes a central-portion acceleration sensor in the present invention, and the G sensors 531 organize a collision acceleration sensor therein.

As obvious from the above description, according to this embodiment, in the satellite sensor unit 53 side, the G data indicative of a collision acceleration of a front portion of the vehicle is sequentially transmitted to the communication line 54 at a predetermined interval without making a collision decision. This signifies that there is no need to use a CPU in the satellite sensor unit 53 side, which enables the satellite sensor unit 3 to be easily constructed at a low cost. In addition, this embodiment can provide various effects similar to those of the above-described first embodiment.

It should be understood that the present invention is not limited to the above-described embodiments, and that it is intended to cover all changes and modifications of the embodiments of the invention herein which do not constitute departures from the spirit and scope of the invention.

For example, although in the above-described embodiment the same data is continuously transmitted twice to prevent the reception of mistaken data stemming from a signal error, the data transmission mode is not limited to this.

Figure 8:
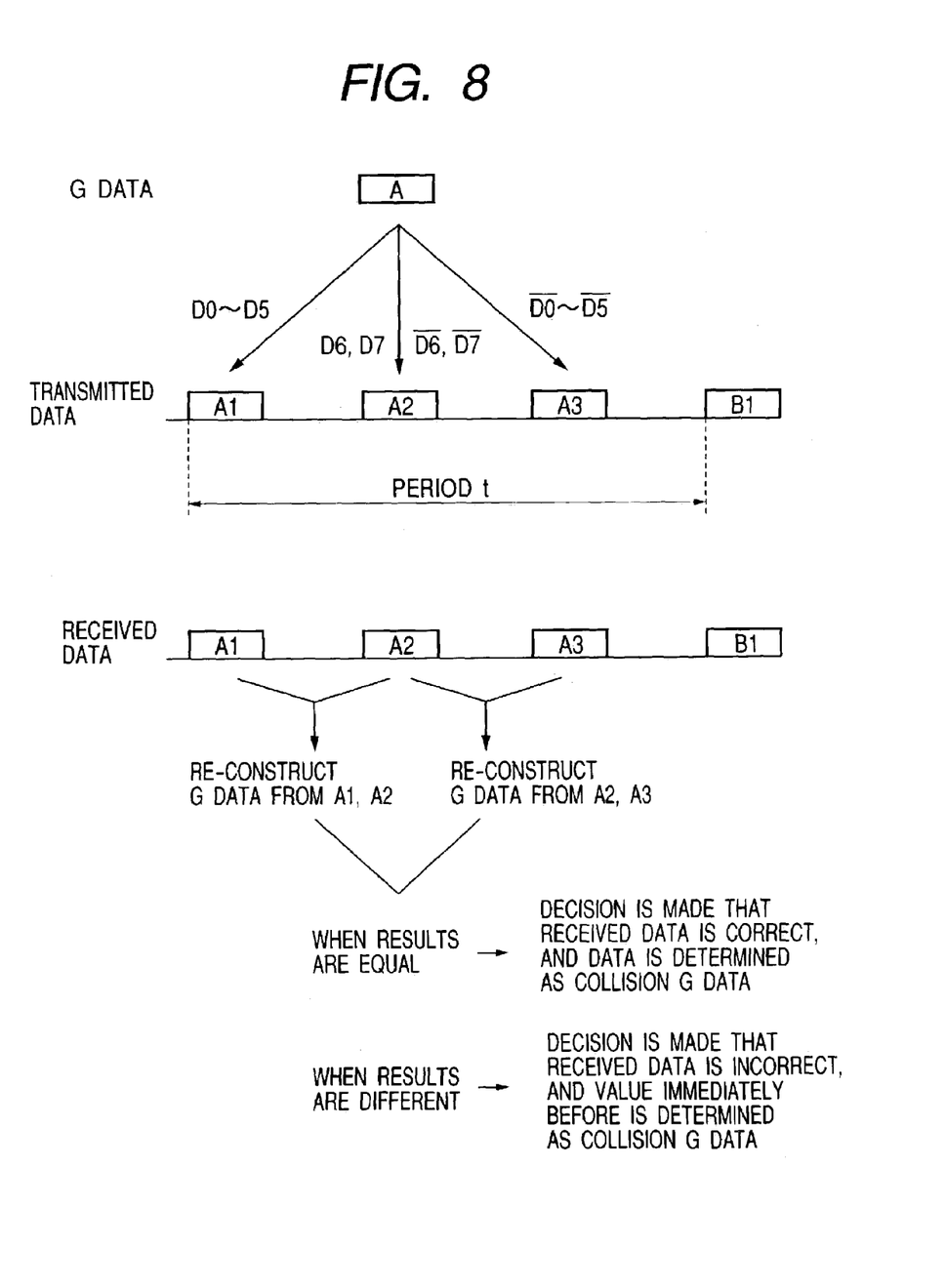
FIG. 8 is an illustrative view useful for explaining a G data transmission mode in a modification example.
Figure 9A:
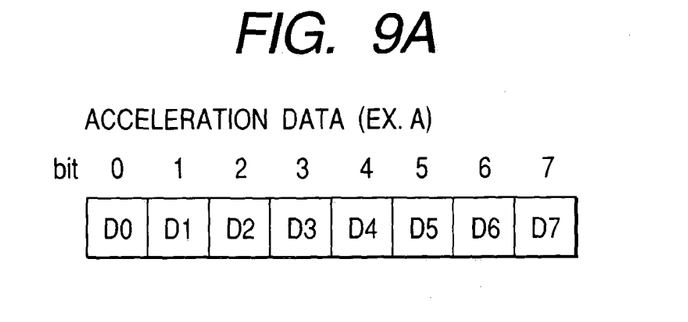
FIG. 9 is an illustrative view useful for explaining data structures of G data and transmitted/received data in a modification example.
Figure 9B:
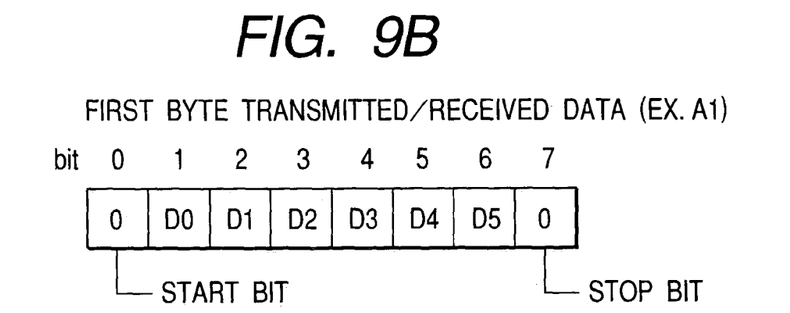
Figure 9C:
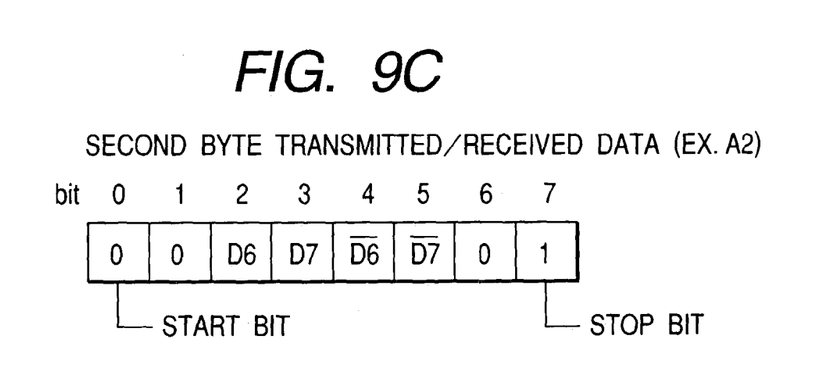
Figure 9D:
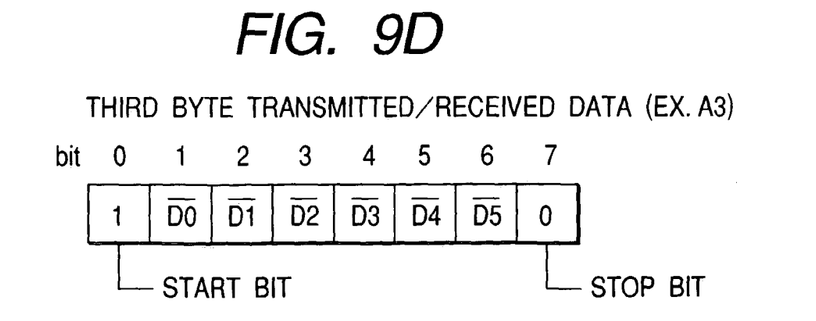

In addition to the above-described mode, it is also appropriate that, as a modification example, as shown in FIG. 8, transmission data is made to have a three-byte structure comprising one set of G data and mirror data thereof. In more detail, as shown in FIGS. 9A to 9D, the first byte of the transmission data comprises bits D0 to D5 of G data and start/stop bits, the second byte thereof comprises bits D6 and D7 of G data, values obtained by inverting "0" and "1" of the bits D6 and D7 and start/stop bits, and the third byte thereof comprises the inverted values of "1" and "0" of bits D0 to D5 of G data and start/stop bits. In this case, for distinguishing among the first to third bytes the start/stop bits pertain to, the start/stop bits of the first byte are set to be "0"/"0", the start/stop bits of the second byte are set to be "0"/"1", and the start/stop bits of the third byte are set to be "1"/"0".

Figure 6:
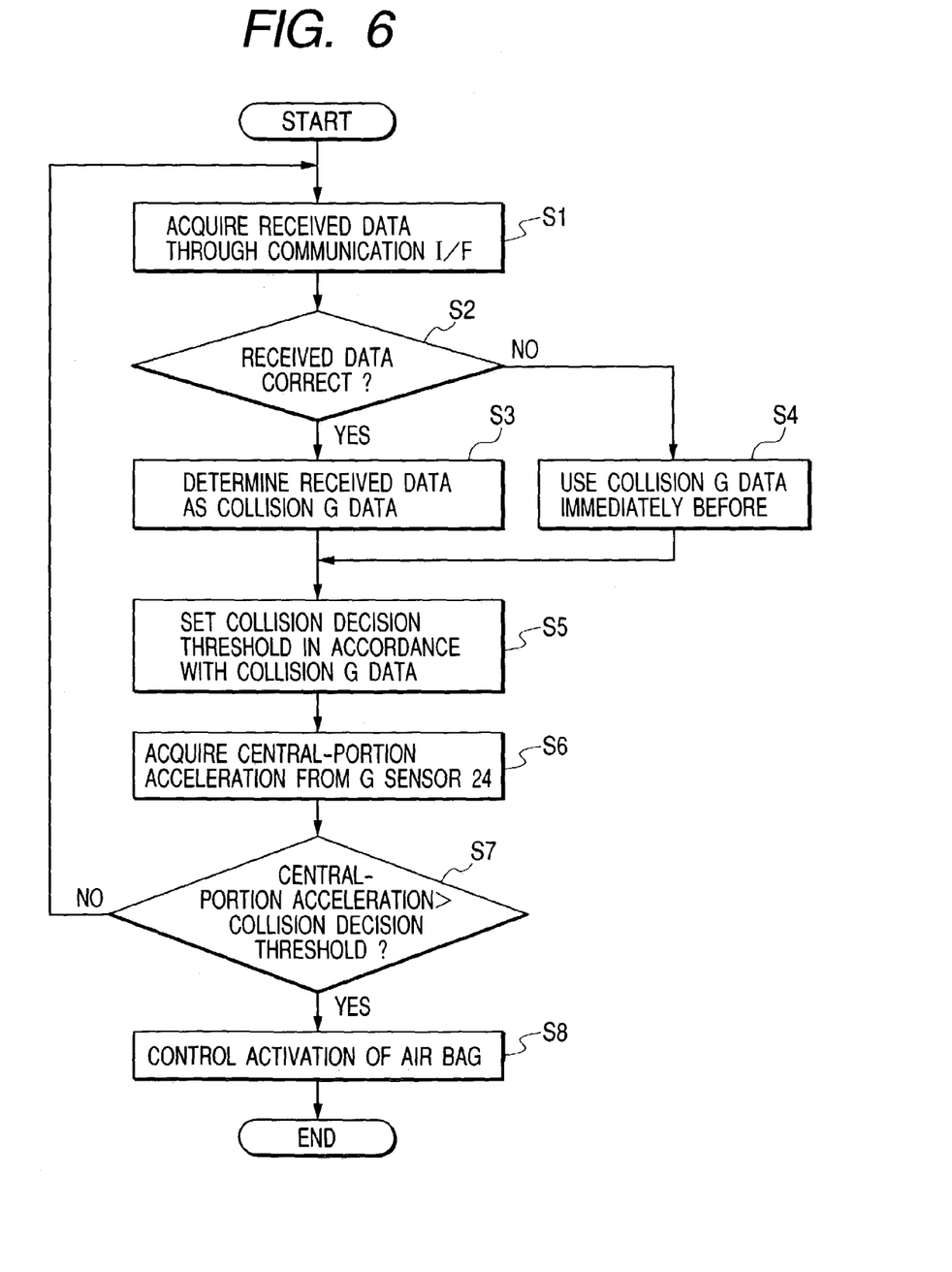
FIG. 6 is a flow chart showing the contents of processing in an air bag activation control routine.

Meanwhile, according to the flow chart shown in FIG. 6, in the air bag ECU 2, the communication interface 25 receives three continuous data through the communication lines 4 (S1). Subsequently, G data is re-constructed by acquiring D0 to D5 from the first byte of the received data and D6 and D7 from the second byte thereof. Moreover, G data is re-constructed by acquiring the inverted values of "0" and "1" of D6 and D7 from the second byte of the received data and the inverted values of "0" and "1" of D0 to D5 from the third byte thereof and inverting the respective bits. At this time, a decision as to whether the received data is correct or not is made on the basis of whether or not the reconstruction results agree with each other (S2). If the two results agree with each other, a decision is made that the received data is correct (S2: Yes), thereby determining the collision G data (S3). On the other hand, if they do not agree with each other, a decision is made that the received data is in error (S2: No), and in place of it, the collision G data immediately before is used as the present collision G data (S4). Thus, according to this modification example, a decision of the correctness of received data is made in a case in which a combination of received digital data and mirror data thereof is correct (good), which leads to certain detection of an error of data occurring due to disturbance noise on the communication lines 4, thereby preventing the reception of mistaken data.

In addition, in the above-described embodiments, in the processing according to the flow chart of FIG. 6, although a collision decision threshold is set in accordance with G data (see S5), other control modes are also acceptable. For example, it is also appropriate that the values of collision G data received from the satellite sensor units 3L and 3R are compared with each other to detect a collision occurring at only one of front left or right portion of a vehicle so that the activation of only one of the air bag 11 for the driver's seat and the air bag 12 for the assistant driver's seat is controlled in accordance with a result of the collision detection. Still additionally, in a case in which the air bags 11 and 12 are made to be spread in a multistage fashion, it is also appropriate that the magnitudes of the collision G data received from the satellite sensor units 3L and 3R are compared with the magnitude of a central-portion acceleration forming a detection output from the G sensor 24 in the air bag ECU 2 and, if the central-portion acceleration is lower than the collision G data, a decision is made that a collision causing a deformation of the vehicle has occurred and the activation control is implemented so that the spread quantities of the air bags 111 and 12 are set to be larger than normal.

Moreover, in the above-described embodiments, although the present invention is used for an activation system for an air bag serving as a passenger protection apparatus, it is naturally that the present invention is also applicable to an activation system for other passenger protection apparatus such as a seat belt with a pretensioner or a motorized seat belt.

Still moreover, it is also appropriate that a satellite sensor is provided at a rear portion of a vehicle to detect a collision (for example, rear-end collision) at the rear portion of the vehicle. For example, in a case in which another car runs into this vehicle from behind, if this fact is detected by the rear-portion satellite sensor and, for example, a headrest(s) is shifted forwardly, it is possible to prevent the passenger from the whiplash. Incidentally, it is also acceptable that satellite sensors are provided at both front and rear portions of a vehicle.

As described above, with an activation system for passenger protection apparatus according to the present invention, the collision sensor unit side sequentially transmits digital data indicative of a collision acceleration at a front portion or side-surface portion of a vehicle to a communication line at a predetermined cycle without implementing a collision decision, which permits the collision sensor unit to have a simple and low-cost configuration, and the collision decision means in the control unit side makes a decision on the occurrence of collision at the front portion or side-surface portion of the vehicle on the basis of a detection output from the central-portion acceleration sensor and digital data representative of a collision acceleration at the front portion or side-surface portion of the vehicle received through the reception means, which enables the passenger protection apparatus to be activated appropriately in accordance with a more accurate and detailed collision decision.

What is claimed is:

1. An activation system for a passenger protection apparatus, designed to activate said passenger protection apparatus in accordance with a behavior of a vehicle, comprising:
   a collision sensor unit provided in a front or rear portion of said vehicle for detecting a collision acceleration of said vehicle;
   a control unit provided at a central portion of said vehicle in its longitudinal direction for controlling the activation of said passenger protection apparatus; and
   a communication line provided between said collision sensor unit and said control unit,
   wherein said collision sensor unit includes:
      a collision acceleration sensor for outputting said collision acceleration of said vehicle in the form of an analog signal;
      conversion means for converting said analog signal outputted from said collision acceleration sensor into a digital signal including digital data and for outputting said digital signal, said digital data including at least one byte of 8 bits; and
      transmission means for
      generating mirror data of said digital data, said mirror data including at least one byte of 8 bits,
      rearranging, in a distributed manner, said digital data into at least two of first to third data and said mirror data into at least two of said first to third data so that said digital data and said mirror data comprise said first to third data, and
      sequentially transmitting, to said control unit through said communication line, said first to third data in byte format at predetermined intervals; and
   said control unit includes:
      a central-portion acceleration sensor for detecting and outputting an acceleration of the central portion of said vehicle;
      reception means configured to
         receive said first to third data outputted from said collision sensor unit through said communication line,
         reconstruct first digital data corresponding to said digital data and second digital data corresponding to said mirror data based on received bits included in said first to third data, and
         determine that data reception is correctly completed when the reconstructed first digital data and the reconstructed second digital data are identical to each other,
      collision decision means for making a decision on the occurrence of collision of said vehicle on the basis of the detection output from said central-portion acceleration sensor and said reconstructed first digital data after said reception means determines that the data reception is correctly completed; and
      activation control means for controlling the activation of said passenger protection apparatus on the basis of a result of the decision in said collision decision means.

2. The system according to claim 1, wherein said collision sensor unit further includes filter means for deriving a signal component needed for the collision decision from said analog signal outputted from said collision acceleration sensor.

3. The system according to claim 1, wherein said conversion means is an analog/digital converter having a resolution and a sampling rate whereby a collision decision waveform is reproducible.

4. The system according to claim 3, wherein said analog/digital converter has a resolution exceeding 8 bits and a sampling rate exceeding 2 kHz.

5. The system according to claim 1, wherein said transmission means is configured to transmit each of said first to third data by converting each of said first to third data into a current value on said communication line.

6. The system according to claim 1, wherein said digital data is composed of at least 9 bits containing one parity bit so that said mirror data is composed of at least 9 bits containing one parity, bit each bit of said digital data belonging to at least two of said first to third data, each bit of said mirror data belonging to at least two of said first to third data so that said digital data and mirror data comprise said first to third data.

7. An activation system for a passenger protection apparatus, designed to activate said passenger protection apparatus in accordance with a behavior of a vehicle, comprising:
   a collision sensor unit provided in a side-surface portion of said vehicle for detecting a collision acceleration of said vehicle;
   a control unit provided at a central portion of said vehicle in its lateral direction for controlling the activation of said passenger protection apparatus; and
   a communication line provided between said collision sensor unit and said control unit,
   wherein said collision sensor unit includes:
      a collision acceleration sensor for outputting said collision acceleration of said side-surface portion of said vehicle in the form of an analog signal;
      conversion means for converting said analog signal outputted from said collision acceleration sensor into a digital signal including digital data including at least one byte of 8 bits and for outputting said digital signal; and
      transmission means for generating mirror data of said digital data, said mirror data including at least one byte of 8 bits, rearranging, in a distributed manner, said digital data into at least two of first to third data and said mirror data into at least two of said first to third data so that said digital data and said mirror data comprise said first to third data, and sequentially transmitting, to said control unit through said communication line, said first to third data in byte format at predetermined intervals;

said control unit includes:

a central-portion acceleration sensor for detecting and outputting an acceleration of the central portion of said vehicle;

reception means configured to
receive said first to third data outputted from said collision sensor unit through said communication line, reconstruct first digital data corresponding to said digital data and second digital data corresponding to said mirror data based on the received bits included in said first to third data, and determine that data reception is correctly completed when said reconstructed first digital data and said reconstructed second digital data are identical to each other;

collision decision means for making a decision on the occurrence of collision of said vehicle on the basis of the detection output from said central-portion acceleration sensor and said reconstructed first digital data after said reception means determines that the data reception is correctly completed; and activation control means for controlling the activation of said passenger protection apparatus on the basis of a result of the decision in said collision decision means.

8. The system according to claim 7, wherein said collision sensor unit further includes filter means for deriving a signal component needed for the collision decision from said analog signal outputted from said collision acceleration sensor.

9. The system according to claim 7, wherein said conversion means is an analog/digital converter having a resolution and a sampling rate whereby a collision decision waveform is reproducible.

10. The system according to claim 9, wherein said analog/digital converter has a resolution exceeding 8 bits and a sampling rate exceeding 2 kHz.

11. The system according to claim 7, wherein said transmission means is configured to transmit each of said first to third data by converting each of said first to third data into a current value on said communication line.

12. The system according to claim 7, wherein said digital data is composed of at least 9 bits containing one parity bit so that said mirror data of said digital data is composed of at least 9 bits containing one parity bit, each bit of said digital data belonging to at least two of said first to third data, each bit of said mirror data belonging to at least two of said first to third data so that said digital data and mirror data comprise said first to third data.

* * * * *